Dec. 8, 1964         D. M. SIMPSON         3,160,420
                      COLLET HOLDER
                    Filed Feb. 4, 1963
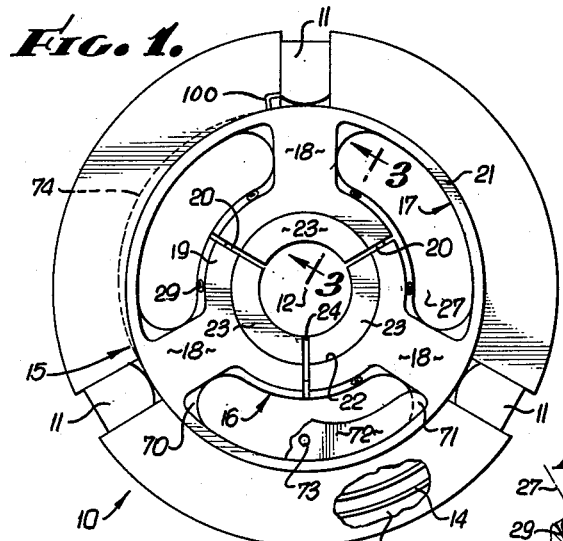
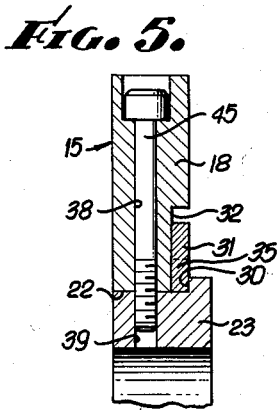
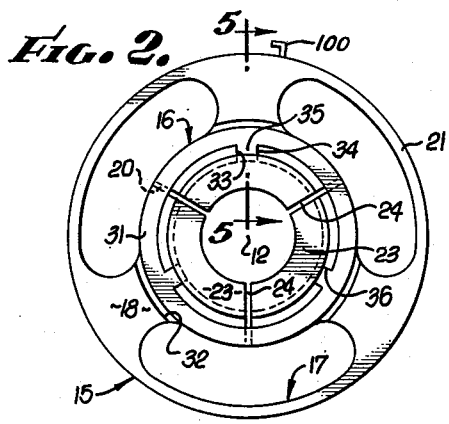
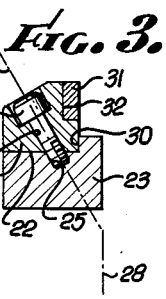
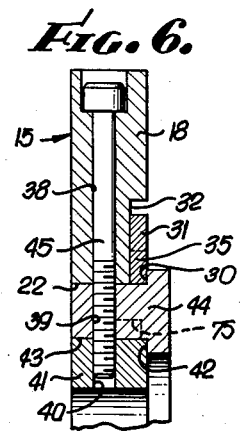
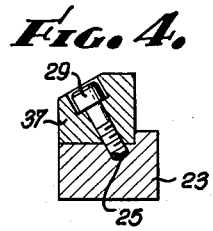
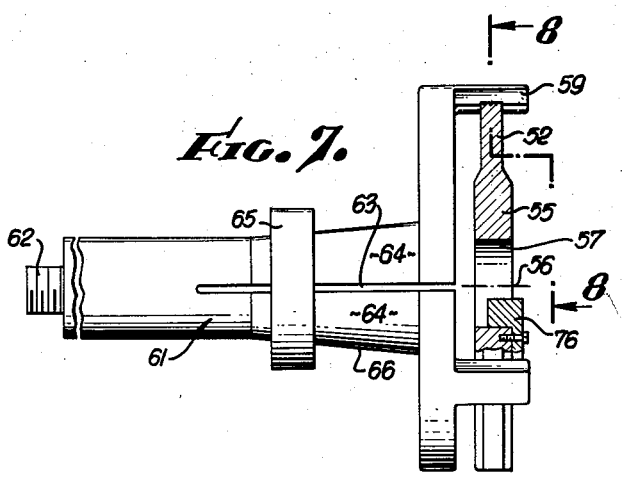
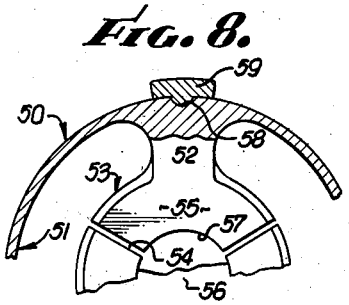
INVENTOR.
DAVID M. SIMPSON
BY
White & Haefliger
ATTORNEYS.

United States Patent Office

3,160,420
Patented Dec. 8, 1964

3,160,420
COLLET HOLDER
David M. Simpson, 2623 Beland Blvd.,
Redondo Beach, Calif.
Filed Feb. 4, 1963, Ser. No. 255,946
7 Claims. (Cl. 279—110)

This invention relates generally to machine tools, and more particularly concerns improved collet holding apparatus characterized as adapted for combination with a multiple jaw chuck in a unique manner.

In the past collets have been made integral with elongated tubular bodies which are threaded remotely from the work grip end of the collet, in order to project through the chuck of a lathe or similar tool and connect to the head structure of the tool. Such collets have the disadvantage, when clamped onto work, of requiring resetting of the work axially, due to their tapered outer surface construction subject to engagement by a collet clamping member.

The present invention overcomes the problems of conventional collet construction mentioned above in a novel and simple manner as will be brought out. Basically, the present invention is founded on the principle that collets may be made to have short axial extent and formed as segments in such manner as to be subject to radial inward and outward movement by novel collet holding apparatus. Broadly speaking, such apparatus may be considered to comprise generally inwardly and outwardly spaced body sections extending about a central axis, one section containing splits dividing it into support portions spaced about the axis, together with body structure, as for example, webs for transmitting force acting to deflect the support portions generally radially and against resistance imposed by the other of said body sections. As will appear, the split section may be inward of the outer body section, and the latter may have resiliently yieldable extents outwardly of the splits. Also, the invention contemplates the provision of a guide, typically in the form of a ring, carried to direct the deflection of the inner section support portions in predetermined radial directions for precisely centering work within said portions. The work may be supported by the inner section portions or by collet segments mentioned previously, which are adapted in a novel manner to the support portions, as will be described.

The above mentioned webs are typically circularly spaced to match the angular spacing of the chuck jaws from which actuating force is transmitted to the webs. Also, the outer section of the body is generally ring-shaped to provide the resiliently yieldable ring extents outwardly of the splits, and functioning to resist the gripping force application acting to deflect inwardly the inner section support portions.

The invention is also concerned with the provision of novel collet segments sized to fit radially inwardly of and outwardly against the inner sections support portions of the holding apparatus. As will be described, the collet segments have fastener openings and stop shoulders interengageable with said portions when the segment fastener openings are aligned with fastener openings in the inner section portions.

These and other objects and advantages of the present invention, as well as the details of an illustrative embodiment, will be more fully understood from the following detailed description of the drawings, in which:

FIG. 1 is a front view showing a chuck having jaws gripping the collet holding apparatus to which collet segments are attached;

FIG. 2 is a view like FIG. 1 but showing the reverse side of the collet holding apparatus with a guide ring attached thereto;

FIG. 3 is a section taken on line 3—3 of FIG. 1;

FIG. 4 is a view like FIG. 3 but showing a construction which does not utilize a guide ring;

FIG. 5 is a view taken on line 5—5 of FIG. 2;

FIG. 6 is a view like FIG. 5 but showing the addition of a collet insert to the outer collet;

FIG. 7 is a side elevation showing a modified form of the collet holding apparatus; and FIG. 8 is a view taken on line 8—8 of FIG. 7.

Referring first to FIGS. 1, 2, 3 and 5, a machine tool chuck is indicated at 10 as having three jaws 11 which move radially toward and away from the axis 12 in response to forward and reverse rotation about said axis of an actuator 13 having a spiral thread 14 engageable with the jaws to effect their movement. This construction of the chuck is typical only, other type constructions embodying movable jaws also being contemplated.

The holder body is indicated generally at 15 as comprising inwardly and outwardly spaced body sections 16 and 17 extending about the axis 12, together with means, as for example, webs 18 for transmitting force acting to deflect the support portions 19 of the inner section 16 in generally radial directions.

The portions or supports 19 are generally segmental, and are separated from one another by splits 20 which are angularly spaced about the axis 12 from the webs 18. The previously mentioned force transmitted by the webs arises from the inward gripping action of the jaws 11 which acts to deflect the portions 19 inwardly. Such deflection is opposed by resistance imposed by the outer section 17, and particularly by resiliently yieldable extents thereof. In the form of the invention shown, such extents lie outwardly of the splits 20 and are shaped arcuately as indicated at 21. Accordingly, the outer section 17 is generally ring-shaped and continuous and may be made of a spring steel or other suitable resiliently yieldable material.

The inner section 16 of the holder body 15 forms a central generally cylindrical opening 22 for receiving the collet segments 23 which are respectively connected to the inner section support portions 19 and inwardly thereof. Typically the collet segments have annular segment shape with their terminals 24 spaced apart at the locations of the splits 20. Furthermore, the segments 23 have fastener openings 25 matching or aligned with the fastener openings 26 in the support portions 19, the axes of such aligned openings being indicated at 27. Such axes are directed at angles to a plane 28 normal to the axis 12, and they are also located in angularly offset relation to the webs 18, with respect to the axis 12. Accordingly, fasteners 29 may readily connect into the typically interiorly threaded openings 25 and 26, without interference with the arcuate extents 21. The segments 23 also have stop shoulders 30 interengageable with the support portions 19 as seen in FIG. 3 when the openings 25 and 26 are in alignment. Accordingly, when the fasteners 29 are tightened, the collet segments 23 are tightly gripped against the support portions 19, both axially and radially.

Referring now to FIGS. 2 and 5, a guide structure, typically in the form of a ring 31 is provided for attachment to the holder 15 in such manner as to guide or direct the deflection of the support portions 19 with predetermined precision, and typically radially, the object being to center the work with respect to axis 12 with a high degree of accuracy. The ring 31 is typically received within an annular groove 32 formed in the holder 15 and particularly the inner section 19 thereof as well as in portions of the webs 18 as illustrated. The support portions 19 and the ring have guide shoulders as shown at 33 and 34 which are adapted for interengagement to direct said deflection generally radially, and typically the shoulders 34 are formed at circularly spaced opposite edges of tabs 35 integral with the ring structure and directed inwardly toward the axis 12. Such tabs fit within notches 36 in the support portions 19 and inwardly of the webs 18. Referring now to FIG. 4, a modified support portion 37 corresponds to the portion 19 excepting for the absence of a guide structure such as the ring 31.

FIGS. 5 and 6 show the provision of a fastener opening extending generally radially through the holder 15 at the web locations 18, and designated at 38. Extensions 39 of such openings extend through the collet segments 23 and further inward extensions 40 of such openings are found in the collet inserts 41 better seen in FIG. 6. The latter shoulder at 42 and 43 against the collet segments 44 as shown to position the inserts both axially and radially when fasteners 45 extend through the openings and extensions 38, 39 and 40 to integrally connect the insert 41, collet segment 44, and the holder 15. Accordingly, sets of inserts 41 may have different radial dimensions for centering work of different radial dimensions, the inserts 41 having annular segment shape similar to that of the collet segments 23.

In FIG. 8, a modified holder body is shown at 50 to have an outer section or ring 51 generally the same as the outer section 17 previously described. The webs 52 connect the outer section to the inner section 53 which contains splits 54 dividing it into supports 55 spaced about the axis 56. In this form of the invention the support portions 55 are adapted to directly support the work within the central opening 57. If desired, collet segments may be used within said opening as indicated at 76. Also, the outer section 51 may be notched as at 58 to receive the series of jaws 59 of the device gripping the holder, the notch 58 serves as a stop engageable with a chuck jaw to orient the ring about the axis 56. In the same manner, a stop is seen at 100 in FIGS. 1 and 2 as engageable with a chuck jaw to orient ring 17 about axis 12.

It will be understood that a series of circularly spaced jaws 59 grip the holder 50 outwardly of the webs 52. The device carrying the jaws 59 is of the construction as shown in FIG. 7, and includes axial tubular extent 61 threaded at 62 and containing axial splits 63 dividing the extent 61 into sections 64 which are radially inwardly deflectable to move the jaws 59 inwardly. A squeeze ring 65 may be worked along the annular taper 66 of the sections 64 to control the inward deflection of the jaws 59.

Referring again to FIG. 1, it will be noted that the webs 18 are recessed at 70 to a depth accommodating reception of the end portion 71 of curved clamp plates 72 extending between the webs as indicated. Such plates contain suitably located openings 73 to pass fasteners attachable to other types of chucks. FIG. 1 also has broken lines 74 indicating the outwardly bowed or deflected condition of the resiliently yieldable arcuate extents 21.

FIG. 6 has broken lines 75 indicating the general location of permanent magnet inserts in segments 44, such magnets constituting an alternate means for holding the collet inserts 41 against shoulders 43.

I claim:
1. Improved collet holding apparatus, comprising a holder body having a central axis and including an outer ring extending continuously about said axis, circularly spaced work supports spaced from but closer to said axis than said ring and circularly spaced webs respectively connecting said supports to said ring, the ring being resiliently yieldable to deflect outwardly at locations spaced from said webs in response to inward deflection of said webs acting to displace said supports inwardly toward said axis.
2. The invention as defined in claim 1, in which said supports contain fastener openings directed at angles to a plane normal to said axis and located in angularly offset relation to said webs, and including collet segments respectively connected to said supports and fasteners in said openings and connecting said supports to said segments.
3. The invention as defined in claim 1, including a guide ring carried by the body to direct said web deflection radially, said guide ring and supports having interengageable guide shoulders extending in the general direction of inward deflection of said webs.
4. The invention as defined in claim 1, in which said supports and webs contain through openings directed radially, and including fasteners in said openings and collet segments connected by said fasteners to said supports and inwardly thereof.
5. The invention as defined in claim 1, in which the outer ring carries a stop engageable with a chuck jaw to orient said ring about said axis with respect to said jaw.
6. For combination with collet holding apparatus comprising a holder body having a central axis and including an outer ring extending continuously about said axis, circularly spaced work supports spaced from but closer to said axis than said ring and circularly spaced webs respectively connecting said supports to said ring, the ring being resiliently yieldable to deflect outwardly at locations spaced from said webs in response to inward deflection of said webs acting to displace said supports inwardly toward said axis, said supports containing fastener openings, the improvement which comprises collet segments sized to fit radially inwardly of and outwardly against the supports, said segments having fastener openings and stop shoulders interengageable with said supports when the segment fastener openings are aligned with said fastener openings in said supports.
7. The invention as defined in claim 6, including inserts sized to fit radially inwardly of and outwardly against the segments, the inserts and segments having other fastener openings and stop shoulders mutually interengageable when said other openings are in alignment.

References Cited in the file of this patent
UNITED STATES PATENTS

| | | |
|---|---|---|
| 838,231 | Ahara | Dec. 11, 1906 |
| 2,854,237 | Richards | Sept. 30, 1958 |
| 2,873,121 | Hahn | Feb. 10, 1959 |